United States Patent [19]

Schippers

[11] 3,746,318

[45] July 17, 1973

[54] SCREW EXTRUDER WITH INTERNAL STATIC MIXING ASSEMBLY

[75] Inventor: Heinz Schippers, Remscheid, Germany

[73] Assignee: Barmag Barmer Maschinenfabrik Aktiengesellschaft, Wuppertal, Germany

[22] Filed: Aug. 16, 1971

[21] Appl. No.: 172,013

[30] Foreign Application Priority Data

Aug. 18, 1970 Germany............... P 20 40 919.2

[52] U.S. Cl..................................... 259/191, 259/4
[51] Int. Cl............................................... B01f 7/08
[58] Field of Search................... 259/191, 192, 193, 259/9, 10, 109, 110, 25, 26, 45, 46; 425/207, 208, 209, 204

[56] References Cited
UNITED STATES PATENTS

| | | |
|---|---|---|
| 2,653,351 | 9/1953 | Henning........................... 425/204 |
| 2,639,464 | 5/1953 | Magerkurth........................ 259/191 |
| 3,310,836 | 3/1967 | Nichols............................. 259/191 |

*Primary Examiner*—Robert W. Jenkins
*Attorney*—John H. Shurtleff

[57] ABSTRACT

A screw extruder for processing thermoplastic materials having a static mixing assembly arranged internally of the conveying screw, preferably with means to direct a melt of the thermoplastic material from one side of a blocking means in the screw channel inwardly and then axially through the static mixing assembly and finally outwardly to the other side of said blocking means.

14 Claims, 5 Drawing Figures

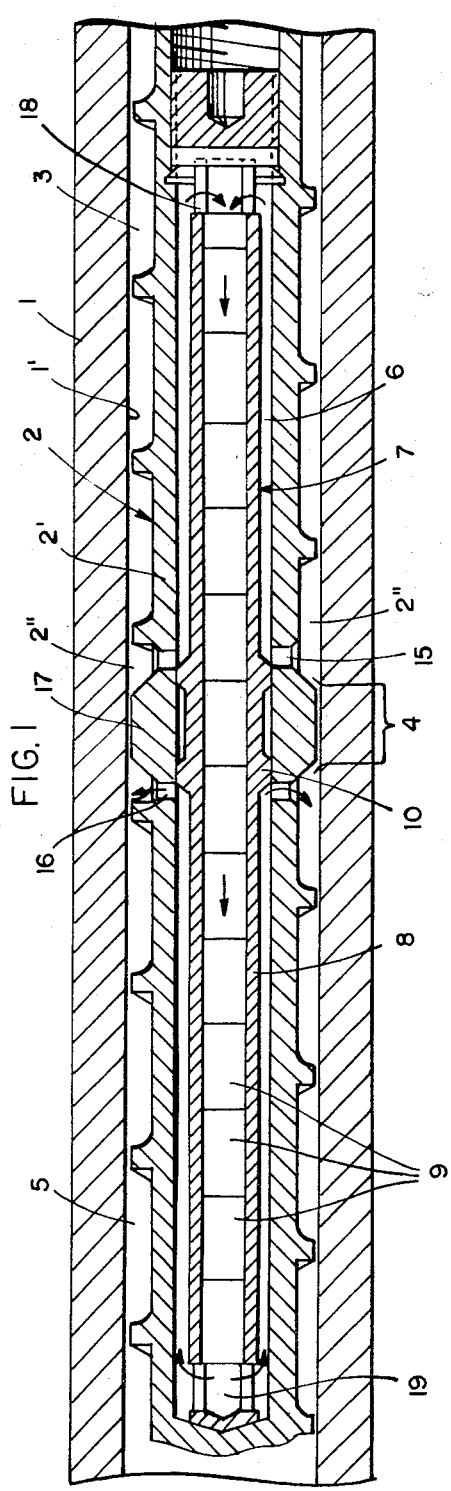
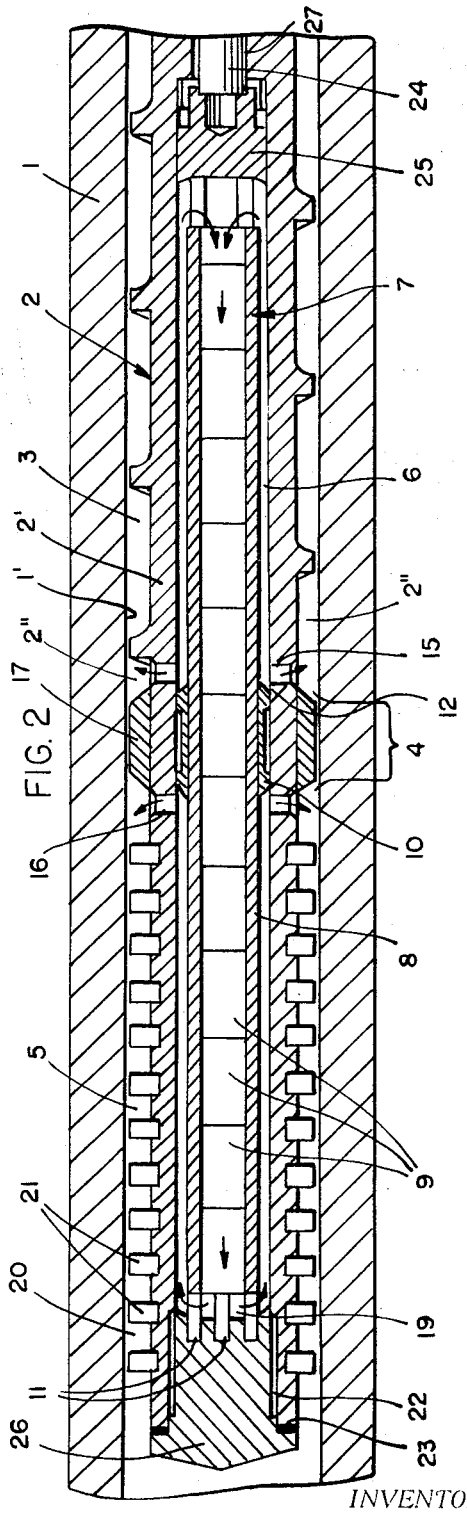
INVENTOR:
HEINZ SCHIPPERS

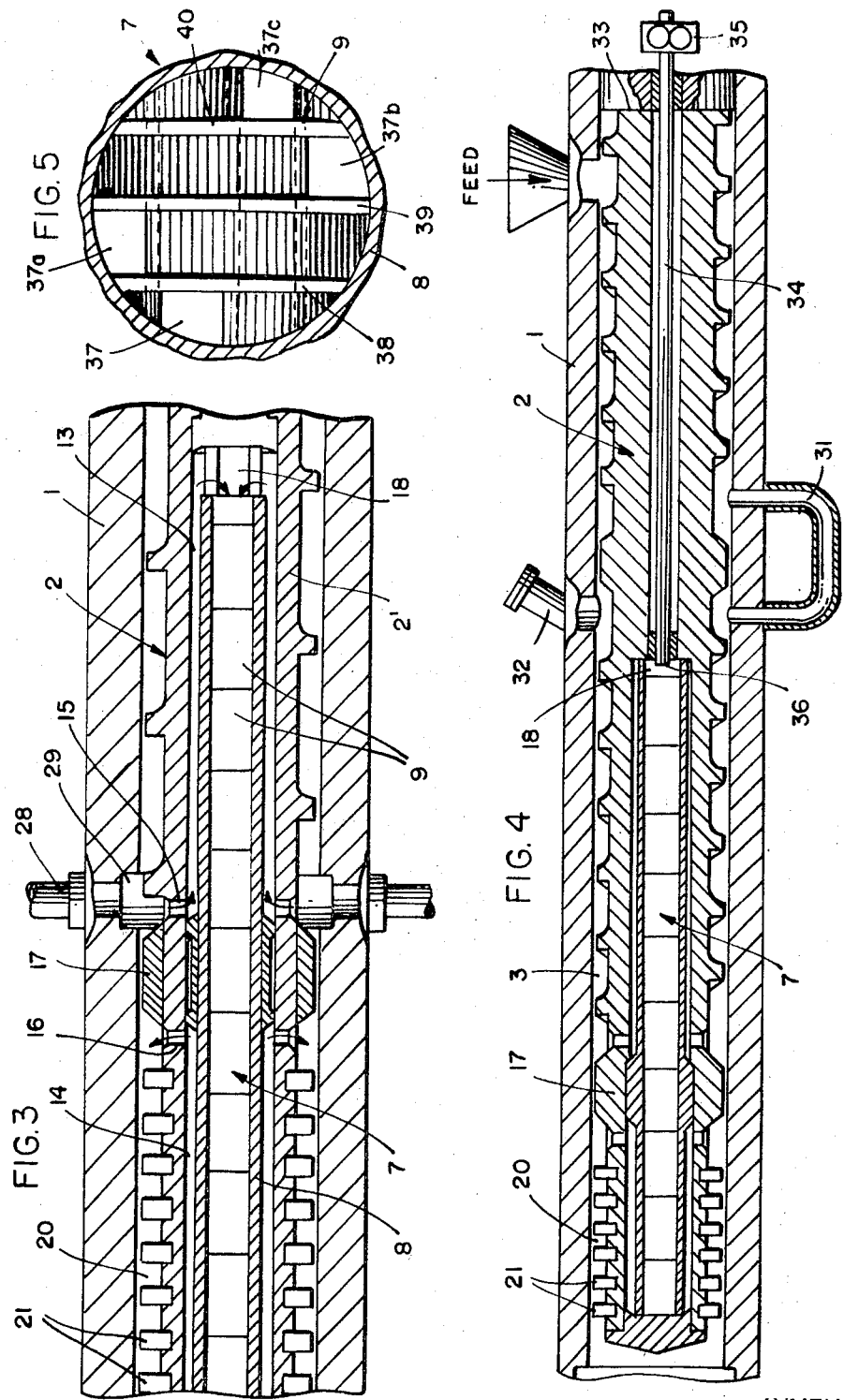

SCREW EXTRUDER WITH INTERNAL STATIC MIXING ASSEMBLY

This invention generally relates to a screw extruder for the processing of molten thermoplastic materials of the type which is provided with a rotated conveying screw and for which there is preferably allocated at least one mixing device whereby the substantially laminar-flowing thermoplastic melt is homogenized or is mixed with one or more additives or other thermoplastic components. By means of this mixing and the associated homogenizing, one seeks to obtain a homogeneously plasticized melt with a desirably uniform ejection temperature as well as a uniform texture and quality. The screw can be conventionally constructed in terms of having the usual feed zone and compression or transition zone as well as one or more metering or discharge zones.

In order to improve the mixing or homogenizing effect of screw extruders, special types of construction have been developed so as to achieve particular mixing and kneading effects. For example, screws have been developed with an eccentric core, alternating course pitch, interrupted flight lands, kneading blades, mixing pins, mixing torpedo shaped bodies and the like, to mention a few forms of screw execution. Conveying screws have also been additionally provided with perforated collars, roll bodies, mixing spirals or baffle elements. Some of these elements may be connected onto the screw itself or onto the inner wall of the barrel housing or on both at the same time. Furthermore, there are a number of embodiments of double-screw mixers and so-called co-kneading machines (see, for example, Schenkel, Kunststoff-extrudertechnik, 2nd edition 1963, pp. 33–34, 41–49 and 52–53; and also Swiss Patent No. 454,432).

The known mixing means either act as elements or components of the screw and are arranged as a rule in a middle zone along the length of the screw and/or at the end of the screw, or else they are provided separately from the screw and are then located along the screw core between interrupted flight lands or threads. They may also be located after the screw with reference to the direction of extrusion, i.e., beyond the metering or discharge end of the conveying screw.

The known mixing devices are disadvantageous inasmuch as their efficiency is limited with respect to achieving an intended high mixing effect. This lack of mixing efficiency is primarily due to the small amount of space available between the screw and its barrel housing. In particular, however, there is generally an insufficient length of the mixing device for the achievement of a high mixing effect, i.e., so that mixing can take place over a sufficiently long melt flow path. Furthermore, conventional mixing devices restrict the effective length of the screw, since the mixing means are arranged in place of the screw flights, or else these mixing means will increase the total construction length of the extruder if the predetermined or requisite length of the screw is retained and in addition to the required number of screw turns there are further provided the necessary mixing means. On the other hand, the structural length of the extruder is also increased if the mixing device is attached in series with the screw.

A reduction of the screw length can have a bad effect in the processing of a number of synthetic thermoplastic materials so that one cannot simply substitute a mixing section for a length of the screw. An increase of the normal structural length of the extruder to permit the addition of a mixing device is always associated with additional costs, especially in the relatively costly construction of the barrel housing. The space requirement in an industrial plant is likewise much greater. In many cases such mixing devices are not economically sound and do not provide a satisfactory result for the additional price being paid.

In a screw extruder with normal length of the fully effective conveying screw and with mixing means in the form of perforated collars, baffle disks or similar elements fastened to the barrel housing, the attainable mixing effect is too little for many thermoplastic polymers. These elements, which are usually constructed as annular bodies, can be executed in an axial direction so that they extend a distance which is narrower than the width of the screw channel. As a rule, they are arranged singly and at certain intervals from one another.

One object of this invention is to provide a screw extruder equipped with a mixing device in such a manner that the screw provided for the optimum working of the thermoplastic material, with or without various mixing components, is practically uninfluenced by this melt mixing device. Thus, it is an object to retain the optimum normal construction length of the screw and the corresponding barrel or screw housing while still providing in fluid or melt flow connection with this screw at least one mixing device which has a sufficiently great structural length in itself so as to achieve an excellent mixing effect for a large number of thermoplastic materials capable of being processed in this manner.

Still another object of the invention is to provide a combination conveying screw and mixing means capable of homogenizing or thoroughly mixing two or more different thermoplastic polymers and/or other additives of substantially different viscosities and/or substantially different heat stabilities. Other objects and advantages of the invention will become more apparent upon further consideration of the following detailed specification.

According to the invention, it has now been found that such objects can be achieved in a highly advantageous manner by means of a screw extruder for processing molten thermoplastic materials, especially viscous high molecular weight thermoplastic polymer melts, said extruder essentially including an elongated rotatable conveying screw mounted in a barrel housing, a static mixing assembly arranged internally of said screw and extending axially of the extruder, and flow directing means to conduct the thermoplastic material as a melt from the outer conveying passage of said screw into and through said mixing assembly.

The static mixing assembly consists essentially of an outer jacket or casing enclosing a plurality of flow guide elements joined securely with the jacket or casing. These flow guide elements are preferably arranged as individual sections or segments axially along the casing and joined end to end with their facing surfaces preferably turned or staggered relatively to each other. The static mixer provided by the invention is arranged to be supported at least at one place along its length in the interior of the screw. At all other places along the mixer casing, there are provided annular spaces between the mixer and the inside wall of a hollow space provided inside the screw core, the melt being supplied through one axially and concentrically arranged annular space to the mixing device and led off from it through a second interconnected annular space.

By reason of the form, arrangement and number of the flow guide elements, the flowing thermoplastic melt is subdivided in its flow path through the mixer a number of times into individual streams which are again further subdivided, and the partial individual streams are rejoined or recombined again with each other such that an intensive overlaying or overlapping of the melt layers takes place. In this manner, there is brought about an intensive and thorough mixing and homogenization of the thermoplastic melt.

The mixing assembly extends in the interior of the screw preferably in a zone between the compression or transition zone of the screw and the discharge end thereof, depending on the size and number of the flow guide elements or segments provided to achieve the desired mixing. Frequently, a shorter construction length is sufficient, and the static mixing assembly preferably extends axially substantially within the metering zone or section of the screw.

A preferred embodiment of the screw mixer according to the invention is characterized by the arrangement of a melt blocking or damming up means as well as of several inlet and outlet openings for the melt in the screw core and a melt annular space between the screw and static mixer to interconnect these openings with the flow path through the mixer. For the purpose of the supplying and leading off the melt to and from the mixing device, the screw core is provided with inlet and outlet openings which are disposed adjacently on either side of a flow obstructing collar in the screw passage or another blocking means for the melt. Such a collar or blocking means is present preferably as an annular bead or cylindrical flange which forms a narrow gap of about 0.1 to 0.2 mm with the inside wall of the screw housing.

By reason of the pressure gradient generated in the extruder, it is thus especially desirable to introduce the melt through the inlet openings provided in the screw core into the interior of the screw where it flows first backwardly through the annular space between screw core and mixer casing to the inlet end of the static mixer, and then flows forwardly through this mixer and is conducted from the outlet end of the mixer backwardly through the additional annular space to the outlet bores or openings in the screw core and again into the screw passage or channel. Preferably the thoroughly mixed melt is guided from the mixer into one of the metering zones adapted to bring about a further homogenization and pressure equalization of the conveyed melt, such metering zone being provided at least behind or downstream after the flow obstructing collar or blocking means along the conveying srew. Preferably the blocking element and the melt inlet openings just prior to this blocking element are arranged in a screw zone at which a sufficiently high pressure has been built up so that the molten thermoplastic material as a laminar flow stream can easily flow through the static mixer with a sufficiently high pressure to overcome shear forces exerted thereon by the flow guide elements.

With the apparatus of this invention, there is provided a mixer internally of the screw and completely within the normal structural length of the extruder, whereby the available space is most favorably utilized. The screw characteristic remains substantially completely and effectively preserved so that neither the length of the screw nor the total length of the extruder is influenced by the incorporation of the mixer. Moreover, the melt on its flow path through the extruder, by reason of the generally well-known high efficiency of a static mixer due to the large number of flow guide elements, is intensively and thoroughly mixed over a relatively short mixing path.

Preferably the static mixer should consist of a cylindrical outer jacket or casing with stationary guide elements or segments arranged in fixed positions over its axial length. Static mixers for the thorough mixing of a fluid medium by means of stationary guide elements are in themselves very well-known. There are known embodiments, for example, with differently constructed guide channels for the melt arranged staggered or offset with respect to one another within several axially aligned disks or blocks (German Patent Nos. 1,178,404 and No. 1,236,479; U.S. Pat. No. 3,182,965), or embodiments have also been disclosed with specially formed guide surfaces offset against each other in axial sequence (U.S. Pat. No. 3,195,865) or also those with little shiplike guide bodies or tapered baffles which are allocated to a common carrier element (U.S. Pat. No. 3,051,452).

There is also known a mixing device for the continuous production of a thermoplastic mixture in which a mixing chamber with a double-conical annular space is formed by means of a stationary, double-conical body or insert and a correspondingly arranged casing wall, in which a hollow mixing tool with passage openings for the mixed material is arranged to move axially and rotatably (German published application No. 1,454,868). Such a mixing device is not suitable for the thorough mixing or homogenizing of molten thermoplastic polymers and it cannot be arranged inside an extruder screw.

The outer jacket or casing of the static mixing assembly of this invention is preferably constructed as a hollow body, especially as a circular cylinder, which is braced or supported by means of connected spacing elements or bridging members on the inner walls of hollow space provided axially within the conveying screw. Preferred bracing elements or bridging members with a radial or axial bracing effect are explained in detail in the description of the drawings, hereinbelow.

According to a further feature of the present invention the screw itself can be additionally provided with at least one mixing zone in which a dynamic mixing device is used. The use of a further mixing zone on the screw core periphery is preferred especially if the thermoplastic melt is to be admixed with one or more additional components.

After the melt has passed through the static mixer, it is also possible to carry out still another mixing and homogenization within the subsequent metering or discharge zones, particularly for the purpose of achieving a uniform temperature distribution between the peripheral melt and the core melt as well as a final homogenization and pressure equalization of the melt.

By reason of the internal arrangement of the proposed static mixer of the invention, it is now also possible to supply to the thermoplastic material being processed in the extruder still another thermoplast, particularly one with a very different viscosity from the thermoplastic material already present in the extruder. One or more additional components or additives with viscosity differing substantially from the thermoplastic material or materials can also be intermixed at a point in the extruder which lies indirectly or immediately before the entrance into the static mixing assembly.

Such substances or components to be admixed can be supplied to the mixing device either axially through the screw itself, for example by means of an axial bore provided between the hollow screw space containing the mixer and the rear end of the screw or a feed line situated in this rear end, or else laterally through the barrel housing of the extruder by means of one or more feed lines connected radially, for example, into the barrel housing at some point in the zone of the static mixer.

A preferred embodiment of the invention therefore includes an annular channel in the barrel housing which issues into the zone or area of the melt inlet openings of the screw core and indirectly before the entrance end of the static mixing assembly. This annular channel in the barrel housing is provided with a suitable feed line and feed source for the additional component and is connected laterally or radially outwardly through the barrel housing. In another very favorable embodiment, the feed line for the additional component is incorporated as an axial line between the entrance end of the static mixer and the rear end of the screw core with a supply line connection to suitable feed pumps or the like.

By reason of the feature that the substances to be admixed are introduced in the immediate or indirect vicinity of the entrance to the static mixer to be combined into the flowing thermoplastic melt, there takes place a compulsory and continuous entrainment or carrying along of the substances being added by the thermoplastic melt into the interior of the static mixer.

Various admixed substances, for example, dyes, pigments, liquid emulsifiers or the like, if desired also another thermoplastic material, can be more sensitive to heat or shearing in some cases than the principal thermoplastic material being worked in the extruder. In this case, such substances are supplied to the melt very late in the overall processing of the extruder. The chosen arrangement of the static mixer and the feed line for other additive components is therefore highly advantageous.

Further, it is possible to arrange the static mixing assembly of the invention, with or without a dynamically acting mixing device, to a screw extruder which is constructed for a degassing of volatile components.

The arrangement of the above-mentioned static mixing means for the thorough mixing of the melt or for the admixing of additional components can be made both on an extruder of the horizontal type and also on an extruder of the vertical type. Other variations of a conventional nature can also be made without departing from the spirit or scope of the invention.

The invention is further described by way of illustration only with the aid of the accompanying drawing schematically representing several embodiments of the invention, wherein:

FIG. 1 is a partial view of a screw extruder in longitudinal section with a conveying screw according to the invention which has a static mixer arranged axially and internally thereof;

FIG. 2 is a similar partial view of a screw extruder corresponding to FIG. 1 with an additional mixing zone provided by a dynamically acting mixing device;

FIG. 3 is a screw extruder corresponding to FIG. 2 with a feed line for mixing additive components which is connected laterally to the barrel housing of the extruder;

FIG. 4 is another screw extruder corresponding to FIG. 2 which is constructed as a degassing or vented extruder and is provided with an axial feed line for introducing added components to the static mixer in the hollow screw; and FIG. 5 is a cross-sectional view taken at the entry face of a specific static mixing device useful in all of the illustrated embodiments.

In the interior of the extruder cylinder or housing 1, there is rotatably mounted in conventional manner the conveying screw 2 which includes, essentially, a metering zone 3, a blocking zone 4 and another metering zone 5 at the discharge end. The feed and transition and transformation zones of the screw are not represented in FIGS. 1 and 2.

The screw 2 is provided with a cylindrical hollow space 6 in which there is firmly supported a static mixer 7. This consists essentially of an outer casing 8 with a plurality of guide elements in individual segments 9 axially secured in the casing and a supporting ring or bridging member 10 which solidly joins the casing 8 of the mixer 7 with the inside wall of the screw core 2' across the hollow space 6. In this structure of the invention, the jacket or casing 8 and thereby also the guide elements or segments 9 turn with the screw 2, but this construction still operates altogether on the principle of a static mixer since the guide elements remain in a fixed position on the wall of casing 8.

By means of the supporting ring 10 there is achieved, on the one hand, a bracing support of the static mixer 7 with respect to the inside wall of the hollow space 6 while, on the other hand, the bridge 10 acts to provide a spacing between the casing 8 and the inside wall of the hollow space 6, thereby forming the free annular flow spaces 13, 14 for the thermoplastic melt. This bridge 10 also acts as a partition to separate the melt flowing into the static mixer 7 through space 13 from the melt emerging from the static mixer 7 through space 14.

The inlet and outlet openings in the screw wall or core 2' extending between the screw passage 2" and the hollow space 6 are designated by 15 and 16 respectively. These openings preferably are circumferentially distributed.

The inlet openings 15 for the thermoplastic melt into the interior of the screw are located immediately in front of the blocking collar or bead 17, which is arranged to provide the blocking zone 4 and whose outer peripheral surface forms with the surface of the housing inner wall 1' a gap of only about 0.1 mm. The outlet openings 16 for the thoroughly mixed thermoplastic melt are situated immediately behind the blocking collar 17.

The melt flows by reason of the pressure prevailing in the screw zone 3 in the direction of the arrows through the openings 15 into the hollow annular space 13 where it is guided to the entry 18 of the static mixer 7. The melt then flows axially forwardly through all the mixing segments 9 as indicated. Here, the melt, by reason of the construction, arrangement and number of the segments 9, is subdivided by a large number of guide elements or baffles into individual streams, and these streams are again subdivided and combined with other partial individual streams. Furthermore, there takes place a rearranging of the subdivided melt layers as usually desired in static mixers. This process is repeated a number of times, e.g., according to the number of segments 9 containing the guide elements in the melt flow path through the static mixer 7. From the outlet 19 of the static mixer 7, the thoroughly mixed thermoplastic melt is conducted in the arrow direction backwardly through the annular space 14 and passes radially through the outlet openings 16 into the metering or discharge zone 5 of the screw (FIGS. 1 and 2).

The embodiment according to FIG. 2 corresponds essentially to that of FIG. 1, except that there is additionally provided along the metering zone 5 a dynamic mixing zone designated by 20. This dynamic zone has a plurality of radially projecting pins 21 which act with a positive movement on the melt flow as the screw rotates, i.e., as commonly provided by a dynamically acting mixing device. Any other type of conventional dynamic mixing means can also be used in the extruder of the invention.

For the purpose of a convenient and simple installation or disassembling of the mixing device 7, there is preferably arranged at the discharge end of the screw (FIG. 2) a pointed tip or nose securely but detachably fastened in the form of a threaded closure member or similar plug 26. This plug 26 is shown with thread 22 and is tightened to the screw core with the aid of a sealing ring or gasket 23.

On the inner side of the closure member or plug 26 facing the hollow space 6, a number of spacer pins 11 are provided which support the mixing device 7 in axial direction. Such spacer pins as bridging members provide sufficient support while leaving melt flow spaces or gaps at the entry and exit ends of the mixer 7. In radial direction the mixer 7 is supported on the screw wall 2' through the bridging ring 10. The entire device 7 is then pressed by the closure member 26, with the aid of the pins 11, against a shoulder 12 provided in the screw wall 2'.

In order to facilitate the disassembly of the mixing device 7, there can also be provided a rod 24 or similar means which is connected with a press-out disk or ejector 25. The rod 24 is arranged in a bore 27 extending axially back through the screw. The press-out disk 25 is then arranged in the interior of the hollow cylindrical space 6. Once the threaded plug 26 is removed, the rod 24 can be shifted a slight distance toward the open end of the extruder sufficient to grasp and slide the mixer 7 out of this open end.

The blocking collar 17 as an element constructed separately from the screw and also the bracing or bridging ring 10 can both be shrunk onto the screw. The ring 10 can then be welded to the casing or jacket 8. The pins 21 are preferably shrunk fit onto the screw core.

According to FIG. 3, there is additionally connected laterally to the barrel housing 1 at least one feed line 28 which is in fluid connection with an annular channel 29 in the housing 1. This channel 29 is provided in the housing at a point in front of the collar 17 of the screw 2, and particularly in the immediate vicinity of the inlet zone of the bores or openings 15.

With the aid of the feed line 28 and of the annular channel 29, a mixing component or additive can be introduced directly through the barrel housing into the thermoplastic melt and, as indicated, at a place which leads directly to the inlet 18 of the static mixer 7. Mixing components or additives with a viscosity which differs appreciably from that of the thermoplastic melt can in this manner be introduced favorably and without difficulties into the initially compressed melt and can then be mixed together with the thermoplastic melt in the static mixer. Such additional components can be optimally mixed with the melt if they first flow together through the static mixer 7 and only afterwards flow through the dynamic mixing zone 20.

According to FIG. 4, the screw extruder is constructed as a degassing or venting extruder. The degassing zone is designated by 30 provided with a melt by-pass 31 and a gas vent 32. The metering and dynamic mixing zones 3 and 20 are substantially constructed as in the preceding embodiments.

The screw 2 in FIG. 4 is provided with a feed line 34 arranged axially between the static mixer 7 and the screw rear end 33, for the purpose of permitting an axial feeding of a mixing component or additive such as coloring agents or the like. The feed line 34 issues into the hollow space 6 of the screw 2 at 36 directly before the inlet 18 of the static mixer 7.

The additive or component fed into the feed line 34 by means of a metering pump 35 or similar means from a feed source is entrained or carried along by the thermoplastic melt flowing into the static mixer 7 at 18 and then mixed into the melt by the flow guide elements of the static mixer.

By way of example, FIG. 5 is a front view of the static mixing device 7 as seen at the entry end looking into the first segment 9. The cylindrical casing 8 surrounds the segment 9 which in this instance is constructed in the manner shown in U.S. Patent No. 3,195,865, this patent being incorporated herein by reference to illustrate one particular type of static mixing element. Thus, a plurality of individual flow guide elements or baffle channels 37, 37a, 37b and 37c in their most restricted portions widen toward the face of the mixing segment 9 to define four parallel openings separated by the vertical walls 38, 39 and 40 which initially divide the main stream entering the mixing device into four separate streams which are then recombined in a different order or at different overlapping positions on the rear side of the segment 9. This subdividing and rejoining of individual streams continues from one segment 9 to the next over the entire length of the mixer 7.

By reason of the arrangement of the static mixer internally of the screw, preferably with an after-engaged mixing zone of the dynamic type and also the feed line provided for introducing other additives or components, the apparatus of the invention makes it relatively simple to admix additional components with differing viscosity or a relatively great heat or shearing sensitivity with the thermoplastic melt. Prior difficulties are especially avoided in view of the feature that these additional substances are supplied to the melt very late in the extruder and are nevertheless well intermixed.

The combination screw extruder and static mixer of the invention is thus applicable to an extremely wide variety of thermoplastic polymers such as polyolefins, polyamides, polyesters, polystyrenes, and polymer blends as well as individual polymers. The temperature of the melt is better equalized due to heat transfer through the screw and mixer constructed of conventional metals such as various well-known steel alloys. In all instances, mixing and homogenizing are very thorough without increasing the normal effective length of the screw itself.

The invention is hereby claimed as follows:

1. A screw extruder for processing a molten thermoplastic material comprising an elongated rotatable conveying screw mounted in a barrel housing, a static mixing assembly which includes an outer casing enclosing a plurality of flow guide elements joined securely therewith and which is arranged internally of said screw to extend axially of the extruder, and flow directing means to conduct the thermoplastic material as a melt from the outer conveying passage of said screw into and through said static mixing assembly.

2. A screw extruder as claimed in claim 1 wherein said flow directing means include a flow obstructing collar in the screw passage together with inlet and outlet openings in the screw core on either side of the collar and an annular space formed between the screw core and the internal mixing assembly to interconnect said inlet and outlet openings with said mixing assembly.

3. A screw extruder as claimed in claim 2 wherein said static mixing assembly includes an outer cylindrical casing enclosing a plurality of flow guide elements joined securely therewith.

4. A screw extruder as claimed in claim 3 wherein said casing is a hollow tubular body supported by bridging members concentrically within an axially extended hollow cylindrical space of the screw.

5. A screw extruder as claimed in claim 4 wherein at least one bridging member is constructed as a supporting ring which extends across said annular space to connect the inner wall of the hollow screw space with the outer wall of said casing between said inlet and outlet openings of the screw core, thereby providing an obstructing partition between said openings.

6. A screw extruder as claimed in claim 5 wherein additional bridging members open to melt flow are provided at either end of said concentrically positioned casing such that said casing is spaced axially inwardly of the corresponding connected ends of the hollow screw space, thereby defining a melt flow path from said inlet openings in said screw core backwardly through said annular space, forwardly through said mixer and again backwardly through said annular space to said outlet openings in said screw core.

7. A screw extruder as claimed in claim 1 wherein said static mixing assembly extends axially substantially within the metering section of the screw.

8. A screw extruder as claimed in claim 1 wherein said conveying screw contains a dynamic mixing zone with dynamic mixing elements along the outer circumference of the screw.

9. A screw extruder as claimed in claim 8 wherein said dynamic mixing elements consist essentially of radially projecting pins set into the screw core.

10. A screw extruder as claimed in claim 1 including a lateral feed line for at least one additional component to be added to the thermoplastic melt, said feed line being connected to an annular channel in the barrel housing which issues into the screw channel in the vicinity of the inlet openings through said screw core for directing melt flow to the static mixing assembly.

11. A screw extruder as claimed in claim 1 including an axial feed line for at least one additional component to be added to the thermoplastic melt, said feed line extending from the rear end of the screw core up to the entry end of the static mixing assembly arranged internally of the screw.

12. A screw extruder as claimed in claim 11 wherein said feed line is arranged in an axial bore of the screw extending backwardly from a hollow space in the screw containing said static mixing assembly.

13. A screw extruder as claimed in claim 1 including at least one feed line in fluid connection with said flow directing means in its path from the channel of the conveying screw to said static mixing assembly.

14. A screw extruder as claimed in claim 13 including at least one dynamic mixing means near the discharge end of the screw extruder.

* * * * *